United States Patent
Tazoe et al.

(10) Patent No.: US 6,326,985 B1
(45) Date of Patent: Dec. 4, 2001

(54) DISPLAY APPARATUS AND METHOD FOR CONTROLLING THE SAME

(75) Inventors: Eiichi Tazoe, Tokyo; Tetsuroh Asahata, Machida; Hiromi Saitoh, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,353

(22) Filed: Jan. 6, 1999

(30) Foreign Application Priority Data

Jan. 7, 1998 (JP) .................................................. 10-001268

(51) Int. Cl.[7] ....................................................... G06F 3/00
(52) U.S. Cl. ......................... 345/764; 345/794; 345/781; 345/788; 345/856
(58) Field of Search ..................................... 345/339, 344, 345/345, 340, 343, 429, 435, 145, 342

(56) References Cited

U.S. PATENT DOCUMENTS

| | | | |
|---|---|---|---|
| 5,390,295 | * 2/1995 | Bates et al. ............................ | 345/342 |
| 5,412,776 | * 5/1995 | Bloomfield et al. ................... | 345/346 |
| 5,469,540 | * 11/1995 | Power, III et al. ..................... | 345/336 |
| 5,561,757 | * 10/1996 | Southgate ............................. | 345/340 |
| 5,666,498 | * 9/1997 | Amro .................................... | 345/342 |
| 5,673,404 | * 9/1997 | Cousins et al. ....................... | 345/347 |
| 5,745,715 | * 4/1998 | Pickover et al. ...................... | 345/348 |
| 5,767,835 | * 6/1998 | Obbink et al. ........................ | 345/146 |
| 6,021,403 | * 2/2000 | Horvitz et al. ........................ | 706/45 |
| 6,025,841 | * 2/2000 | Finkelstein ........................... | 345/342 |

FOREIGN PATENT DOCUMENTS

| | | | |
|---|---|---|---|
| 63017488 | 1/1988 | (JP) | ................................. G09G/1/02 |
| 64078290 | 3/1989 | (JP) | ................................. G09G/1/00 |
| 03186893 | 8/1991 | (JP) | ................................. G09G/5/14 |
| 04336321 | 11/1992 | (JP) | ................................. G09G/3/14 |

\* cited by examiner

Primary Examiner—Raymond J. Bayerl
Assistant Examiner—Cuong T. Thai
(74) Attorney, Agent, or Firm—Roy W. Truelson

(57) ABSTRACT

The present invention provides an excellent display apparatus effectively using the display area of the object/window in the inactive state existing on the display screen and a method for controlling the display apparatus. At least one object/window is displayed on the display screen of a display apparatus in a bitmap manner in accordance with the present invention. A determination as to whether a predetermined object/window displayed on the display screen is in an active state, or not, is always made, and the display contents of the predetermined object/window is switched in accordance with the result of the determination. For example, if the predetermined object/window is in the active state, a regular display contents of the predetermined object/window is displayed, and if the predetermined object/window is in the inactive state, another information, such as an advertisement information, is displayed. In the is inactive state, the operator does not require the regular display data of the predetermined object/window, and a display area of the display screen can be effectively used by displaying notification information, such as the advertisement information, to provide the operator with the useful information. It realizes a secondary effect in which the manufacturers of the display apparatus and the display application programs get an advertising revenue in addition to a selling profit.

26 Claims, 4 Drawing Sheets

[Figure 1]
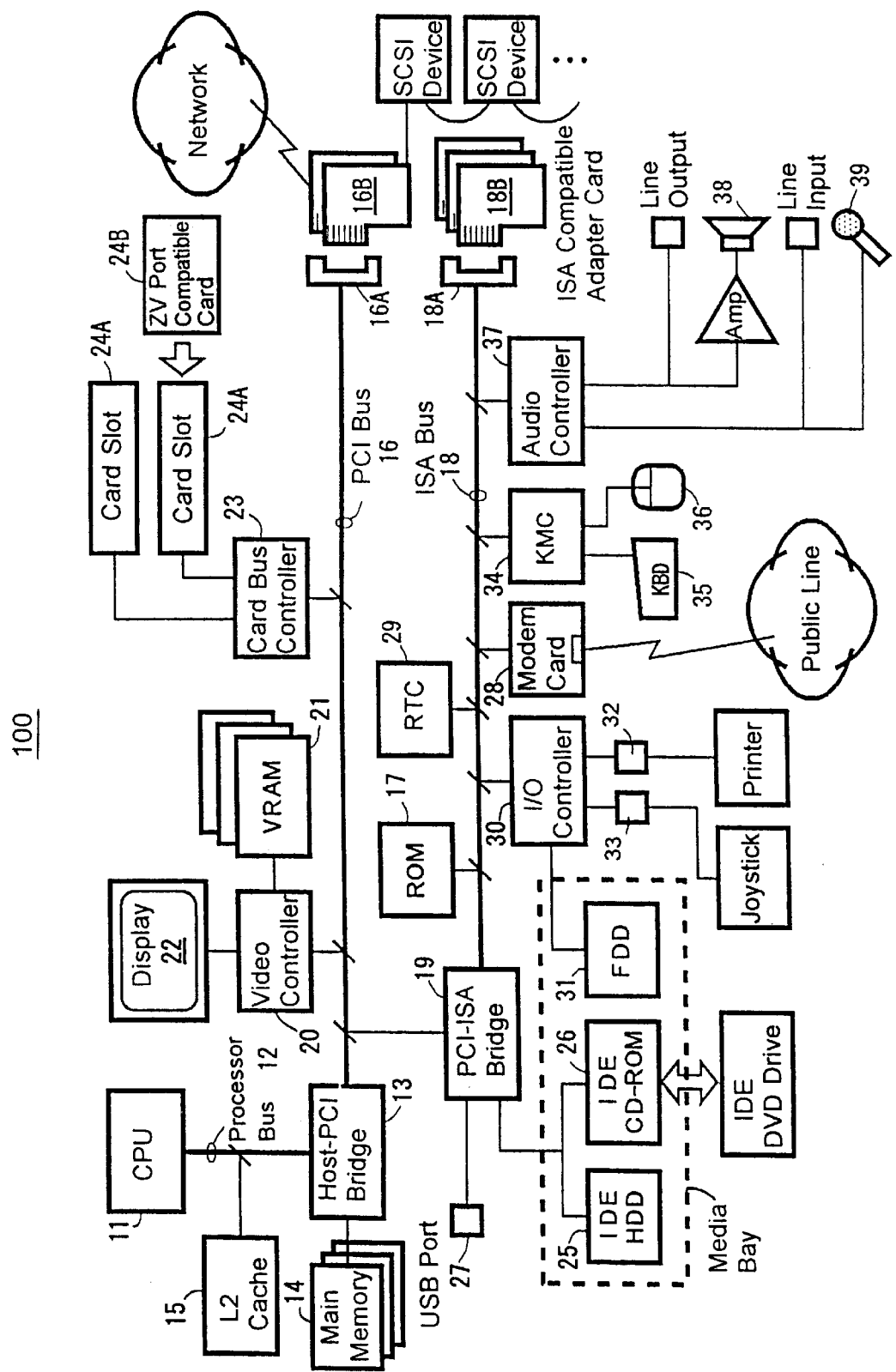

[Figure 2]
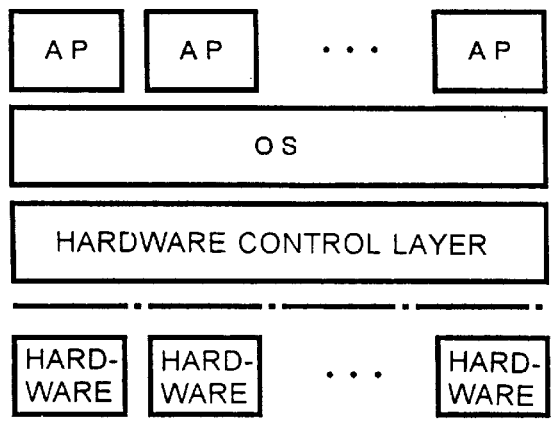
[Figure 3]
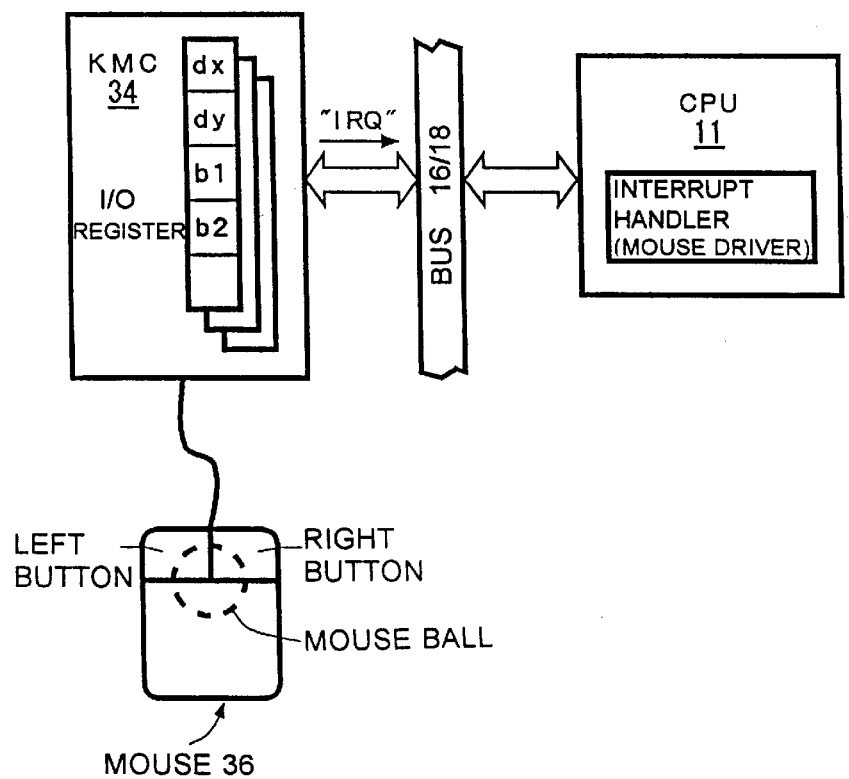

[Figure 4]
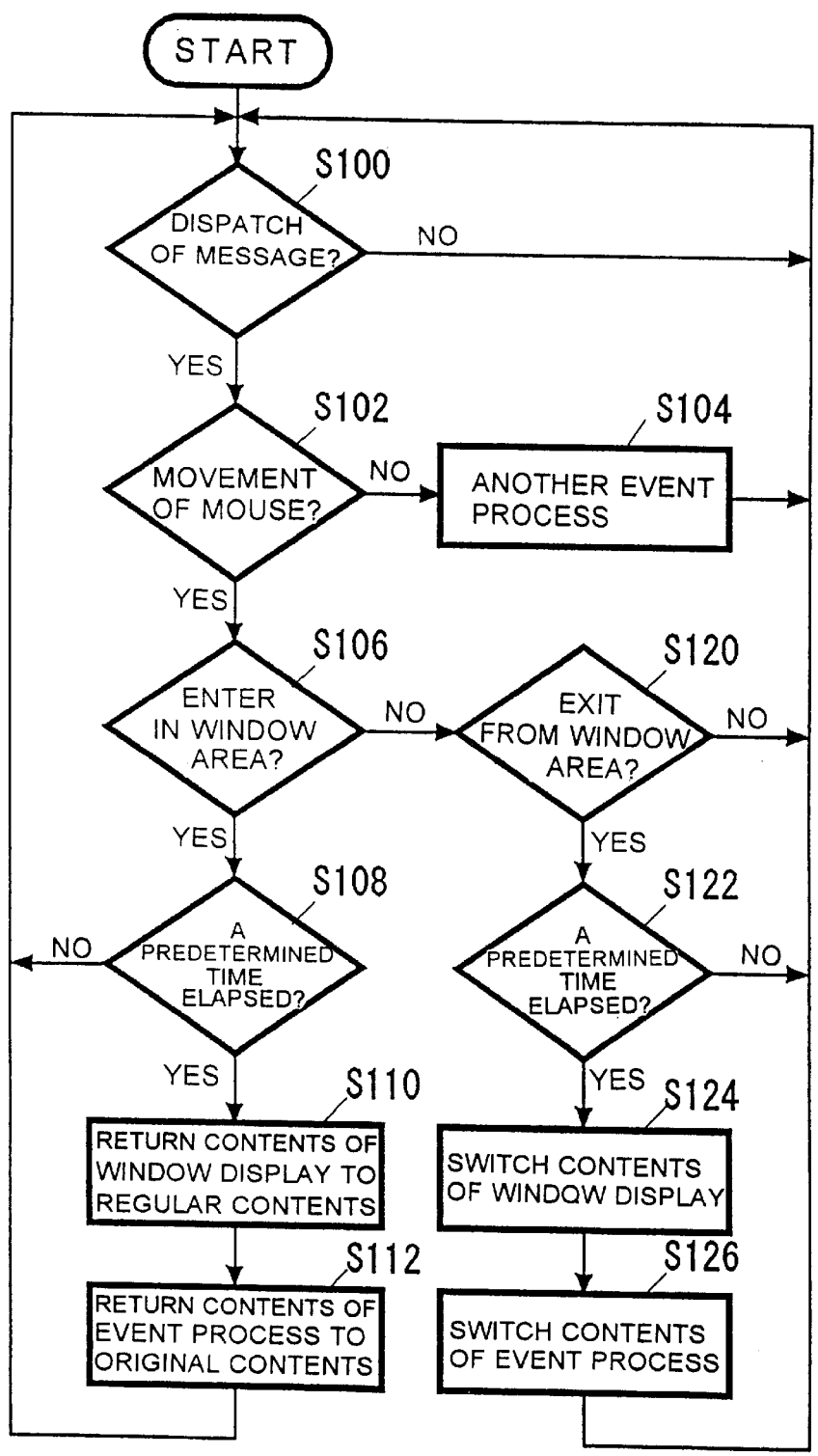

[Figure 5]
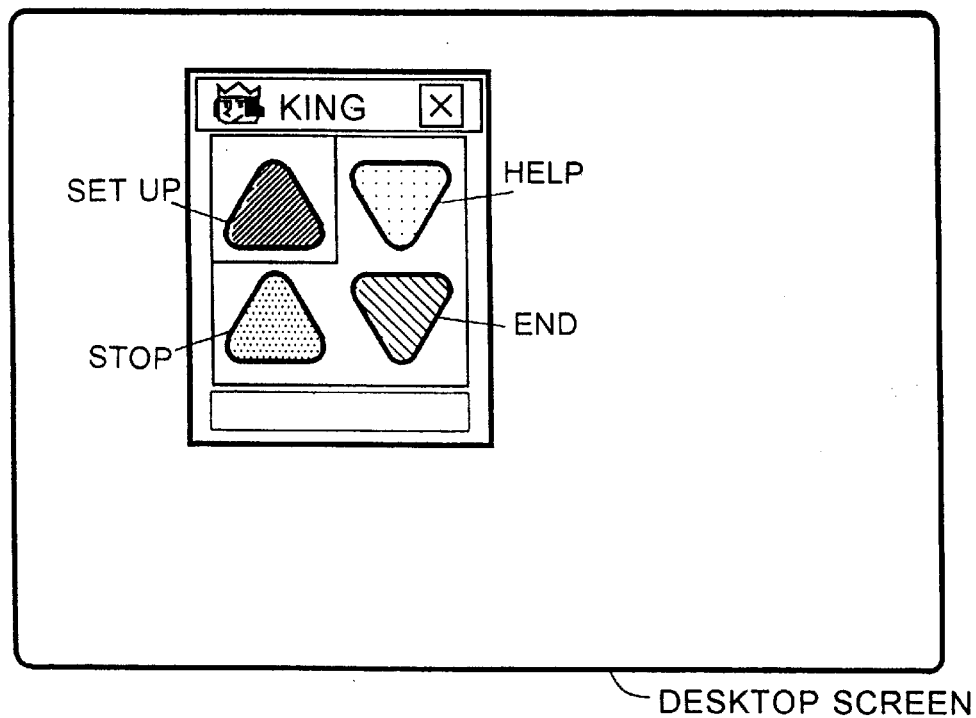
[Figure 6]
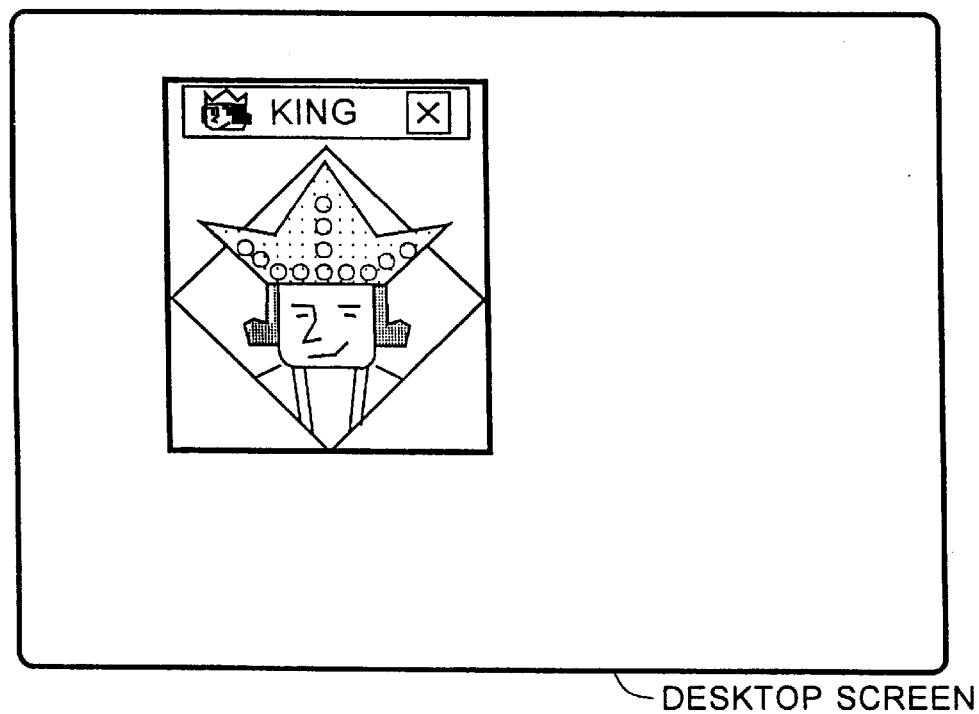

DISPLAY APPARATUS AND METHOD FOR CONTROLLING THE SAME

FIELD OF THE INVENTION

The present invention relates to a display apparatus of a type in which processed data are displayed on a display screen in a bitmap manner, as made in a computer system, and a method for controlling the display apparatus. More particularly, the present invention relates to a display apparatus capable of simultaneously displaying a plurality of objects/windows on the display screen and a method for controlling the display apparatus. More particularly, the present invention relates to a display apparatus effectively using a display area of an object/window in an inactive state existing on the display screen and a method for controlling the display apparatus.

BACKGROUND OF THE INVENTION

With the recent advance of technology, various kinds of personal computers (PCs), such as a desktop type, a tower type, a notebook type, etc., have been developed and marketed. The recent PCs usually include a function for displaying an image as a bitmap, in which the image is displayed in a picture element unit, due to an enhanced video subsystem and an enhanced capability of processing arithmetic operations of a central processing unit (CPU).

An Operating System, such as "OS/2" of IBM Corporation ("OS/2" is a trademark of IBM Corporation) and "Windows95" of Microsoft Corporation, is installed with a Graphical User Interface (GUI). Generally, the computer system providing the GUI environment allows the use of an input device; i.e., a pointing device, such as a mouse, a track ball, a touch pad, or a track point, which is capable of pointing to a coordinate position.

The pointing device realizes two basic functions. One is a function for two dimensionally moving a cursor (a mouse cursor) on the display screen, and the other is a click function of the mouse button indicating a select operation. The user can select a function relating to the object by moving the mouse cursor to a particular position of the display screen, such as a position within the display area of the object, and performing a click operation of the mouse button (usually the click of a left button). The user of the computer system has a personal habit that he/she tends to move or place the mouse cursor on the object; for example, the active window now worked, to which he/she is just focusing. The reason for this action is to smoothly perform the select operation on the object being focused.

Many object symbols, such as icons, folders, are prepared on the display screen; i.e., "desktop," in the GUI environment. The user can select the desired object symbol by moving the mouse cursor to the desired icon or the folder by using the pointing device, and performing the click operation of the mouse button. For example, if the user selects the icon relating to a particular application, the application is activated and the application window is opened.

In a multitasking Operating System, a plurality of application windows are simultaneously opened on the desktop (it is called a multiwindow), and the applications now activated are processed in a time sharing scheme. For example, when the user performs an editing operation on the forefront surface, another application of the background surface is executed or in a standby state.

The active window is the display area being just focused by the user to which the user can perform the input operation by the key/mouse. Usually, the mouse cursor is placed within the active window, as described above, while the inactive window(s) located in the background or on the periphery of the active window is not focused by the user, and is the display area to which the input operation by the key/mouse is impossible and is in the inactive state. The mouse cursor tends to not be placed in the inactive window.

The window in the inactive state is ineffective but to merely occupy a portion of the display screen, and is equivalent to dead space.

The active/inactive state of the object/window correlates with the position of the mouse cursor. A prior technology has already existed to cause the GUI to change in relation to the manipulation of the mouse. For example, it has been well known in the art to switch a frame of a button or an area within the frame displayed in a three-dimensional mode to a highlight display mode and to prompt the user input in response to a detection that the cursor enters into the frame of the button. This technology is used in several applications. But, such change of the display mode of the button is only to notify to the user, and does not cause the display area in the inactive state to be effectively used.

A task bar in "Windows95" or "Windows" of Microsoft Corporation can be listed as another prior technology for changing the GUI in relation to the manipulation of the mouse. The task bar has an optional function that the task bar buries outside of the desktop in the case that the mouse cursor is not positioned in the display area of the task bar. The operation for burying the task bar has an effect for effectively using the inactive area. Such burying operation, however, vacates its own display area to others, and has the nature as if it becomes the icon. Also, in this case, the manipulation on the task bar requires a two-step operation; i.e., an operation for appearing the buried task bar for a start, and an operation for performing the manipulation for the selection.

PROBLEM SOLVED BY THE INVENTION

It is an object of the present invention to provide a display apparatus in which the processed data are displayed on the display screen in the bitmap manner and a method for controlling the display apparatus.

It is an another object of the present invention to provide a display apparatus capable of simultaneously displaying a plurality of objects/windows on the display screen and a method for controlling the display apparatus.

It is an another object of the present invention to provide a display apparatus effectively using the display area of the object/window in the inactive state existing on the display screen and a method for controlling the display apparatus.

SUMMARY OF THE INVENTION

The present invention is made to realize the above objects. A first aspect of the present invention is a display apparatus which comprises: a display having a display screen on which data are displayed in a bitmap manner; an object/window display means for displaying at least one object/window on the display screen; a monitoring means for determining as to whether an object/window displayed on the display screen is in an active state, or not; and an object/window display control means for responding to a result of the determination to switch display contents of the object/window.

A second aspect of the present invention is a display apparatus which comprises: a display having a display screen on which data are displayed in a bitmap manner; an object/window display means for displaying at least one object/window on the display screen; a pointing device for pointing coordinates on the display screen; a mouse cursor control means for responding to a manipulation of the pointing device to control the display of a mouse cursor on the display screen; a mouse cursor monitor means for determining as to whether the mouse cursor resides within a predetermined object/window, or not; and an object/window display control means for displaying regular display contents in a display area of the predetermined object/window while the mouse cursor resides within the predetermined object/window, or displaying the other display contents in the display area of the predetermined object/window while the mouse cursor has disappeared from the predetermined object/window.

A third aspect of the present invention is a display apparatus which comprises: a display having a display screen on which data are displayed in a bitmap manner; an object/window display means for displaying at least one object/window on the display screen; a pointing device for pointing coordinates on the display screen; a mouse cursor control means for responding to a manipulation of the pointing device to control the display of a mouse cursor on the display screen; a mouse cursor monitor means for determining as to whether the mouse cursor resides within a predetermined object/window, or not; a storage means for storing notification information which should be notified to a user; and an object/window display control means for displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window.

A fourth aspect of the present invention is a display apparatus installed with a window system for displaying at least one object/window on a display screen of a display in a bitmap manner, which comprises: a processor executing a software program; a memory for temporarily storing program codes and data being processed; a pointing device for pointing coordinates on the display screen; a mouse cursor control means for responding to a manipulation of the pointing device to control the display of a mouse cursor on the display screen; a mouse cursor monitor means for determining as to whether the mouse cursor resides within a predetermined object/window, or not; a storage means for storing notification information which should be notified to a user; an object/window display control means for displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window; and a connecting means for connecting to a network.

A fifth aspect of the present invention is a method for controlling a display apparatus installed with a window system for displaying at least one object/window on a display screen of a display in a bitmap manner, which comprises the steps of: determining as to whether an object/window displayed on the display screen is in an active state, or not; and responding to a result of the determination to switch display contents of the object window.

A sixth aspect of the present invention is a method for controlling a display apparatus installed with a window system for displaying at least one object/window on a display screen of a display in a bitmap manner, and including a pointing device for pointing coordinates on the display screen, which comprises the steps of: (a) responding to a manipulation of the pointing device to control the display of a mouse cursor on the display screen; (b) determining as to whether the mouse cursor resides within a predetermined object/window, or not; and (c) displaying regular display contents in a display area of the predetermined object/window while the mouse cursor resides within the predetermined object/window, or displaying the other display contents in the display area of the predetermined object/window while the mouse cursor has disappeared from the predetermined object/window.

A seventh aspect of the present invention is a method for controlling a display apparatus installed with a window system for displaying at least one object/window on a display screen of a display in a bitmap manner, and including a pointing device for pointing coordinates on the display screen and a storage means for storing notification information which should be notified to a user, which comprises the steps of: (a) responding to a manipulation of the pointing device to control the display of a mouse cursor on the display screen; (b) determining as to whether the mouse cursor resides within a predetermined object/window, or not; and (c) displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window.

An eighth aspect of the present invention is a method for controlling a display apparatus installed with a window system for displaying at least one object/window on a display screen of a display in a bitmap manner, and including a processor for executing a software program, a memory for temporarily storing program codes and data being processed, a pointing device for pointing coordinates on the display screen, a storage means for storing notification information which should be notified to a user, and a connecting means for connecting to a network, which comprises the steps of: (a) responding to a manipulation of the pointing device to control the display of a mouse cursor on the display screen; (b) determining as to whether the mouse cursor resides within a predetermined object/window, or not; and (c) displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window.

A ninth aspect of the present invention is a computer readable storage medium for storing in a tangible form a computer program executable on a computer system installed with a window system for displaying at least one object/window on a display screen of a display in a bitmap manner, which comprises: a routine for determining as to whether an object/window displayed on the display screen is in an active state, or not; and a routine for responding to a result of the determination to switch display contents of the object/window.

A tenth aspect of the present invention is a computer readable storage medium for storing in a tangible form a computer program executable on a computer system installed with a window system for displaying at least one object/window on a display screen of a display in a bitmap manner, and including a pointing device for pointing coordinates on the display screen, which comprises: (a) a routine for responding to a manipulation of the pointing device to control the display of a mouse cursor on the display screen; (b) a routine for determining as to whether the mouse cursor resides within a predetermined object/window, or not; and (c) a routine for displaying regular display contents in a display area of the predetermined object/window while the mouse cursor resides within the predetermined object/window, or displaying the other display contents in the display area of the predetermined object/window while the mouse cursor has disappeared from the predetermined object/window.

An eleventh aspect of the present invention is a computer readable storage medium for storing in a tangible form a computer program executable on a computer system installed with a window system for displaying at least one object/window on a display screen of a display in a bitmap manner, and including a pointing device for pointing coordinates on the display screen, and a storage means for storing notification information which should be notified to a user, which comprises: (a) a routine for responding to a manipulation of the pointing device to control the display of a mouse cursor on the display screen; (b) a routine for determining as to whether the mouse cursor resides within a predetermined object/window, or not; and (c) a routine for displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window.

A twelfth aspect of the present invention is a computer readable storage medium for storing in a tangible form a computer program executable on a computer system installed with a window system for displaying at least one object/window on a display screen of a display in a bitmap manner, and including a processor for executing a software program, a memory for temporarily storing program codes and data being processed, a pointing device for pointing coordinates on the display screen, a storage means for storing notification information which should be notified to a user, and a connecting means for connecting to a network, which comprises: (a) a routine for responding to a manipulation of the pointing device to control the display of a mouse cursor on the display screen; (b) a routine for determining as to whether the mouse cursor resides within a predetermined object/window, or not; and (c) a routine for displaying regular display contents in a display area of the predetermined object/window while the mouse cursor resides within the predetermined object/window, or fetching the notification information from the storage means to display the notification information in the display area of the predetermined object/window while the mouse cursor has disappeared from the predetermined object/window.

In the third, fourth, seventh, eighth, eleventh, and twelfth aspects of the present invention, the notification information can be a status of another application executed on the display apparatus.

In the third, fourth, seventh, eighth, eleventh, and twelfth aspects of the present invention, the notification information can be an advertisement information.

In the fourth, eighth, and twelfth aspects of the present invention, the notification information can be an advertisement information which is regularly or nonregularly updated through the internet.

In the third, fourth, seventh, eighth, eleventh, and twelfth aspects of the present invention, a title bar of the original object/window can be displayed when the notification information is displayed on the display area of the original object/window.

A thirteenth aspect of the present invention is an object appearing on a desktop display surface of a computer system installed with a window system for displaying at least one object/window in a bitmap manner, which comprises: first display contents displayed on an area of the object during an active state of the object; and second display contents displayed on the area of the object during an inactive state of the object.

A fourteenth aspect of the present invention is an object appearing on a desktop display surface of a computer system installed with a window system for displaying at least one object/window in a bitmap manner, which comprises: first display contents displayed on an area of the object; second display contents displayed on the area of the object; a determination means for determining as to whether the object is in an active state, or not; and a display switching means for responding to the active/inactive state of the object to switch display contents of the object to one of the first display contents and the second display contents.

Wherein the determination means may judge the state of the object as the active state when a cursor resides within the area of the object during a time period equal to or longer than a predetermined value.

At least one object/window is displayed on the display screen of a display apparatus in a bitmap manner in accordance with the present invention. A determination as to whether a predetermined object/window displayed on the display screen is in an active state, or not is always made, and the display contents of the predetermined object/window is switched in accordance with the result of the determination. For example, if the predetermined object/window is in the active state, a regular display contents of the predetermined object/window is displayed, and if the predetermined object/window is in the inactive state, another information, such as an advertisement information, is displayed. In the inactive state, the operator does not require the regular display data of the predetermined object/window, and a display area of the display screen can be effectively used by displaying notification information, such as the advertisement information, to provide the operator with the useful information. It realizes a secondary effect in which the manufacturers of the display apparatus and the display application programs get an advertising revenue in addition to a selling profit (in this case, the decrease of the selling cost of the program products can be realized).

The active/inactive states of the object/window used in the specification have the same meaning as focusing/unfocusing the object/window. The computer system providing the GUI environment in the bitmap display manner is provided with the pointing device, such as the mouse, as a standard feature, and in this case, the operator of the computer system tends to move the mouse cursor into his/her focus area. Accordingly, the determination as to whether a predetermined object/window displayed on the display screen is in an active state, or not can be made by monitoring as to whether the mouse cursor is placed on the predetermined object/window, or not. The regular display contents of the predetermined object/window is displayed in a display area of the object/window while the mouse cursor is placed on the object/window, and the notification information fetched from notification information storage device can be displayed in the display area of the object/window while the mouse cursor does not exist on the object/window.

The computer readable storage medium relating to the ninth through twelfth aspects defines the structural and functional operative relationship between the computer program and the storage medium to realize the functions of the computer program on the computer system. In other words, the cooperative operation is realized on the computer system by mounting the computer readable storage medium to the computer system (or installing the computer program into the computer system) to realize the meritorious effects of the display apparatus and the method for controlling the display apparatus of the first through eighth aspects of the present invention.

The foregoing and other purposes, features and advantages of the invention will be apparent from the following more particular description of the preferred embodiment of the invention as illustrated in the drawings.

BRIEF DESCRIPTION OF THE DRAWINGS

FIG. 1 schematically shows a hardware configuration of a typical personal computer (PC) 100.

FIG. 2 schematically shows a hierarchical structure of the software programs capable of being executed by the computer system 100 in the embodiment.

FIG. 3 schematically shows a mechanism for processing the inputted data from the mouse 36.

FIG. 4 shows a processing routine of the application program for realizing the present invention in the form of the flow chart.

FIG. 5 shows one example of the regular contents of the application window.

FIG. 6 shows one aspect of the display contents in the window switched to the notification information.

DESCRIPTION OF THE EMBODIMENT

The embodiments of the present invention will be described with reference to to the drawings.
A. Hardware Configuration of the Computer with External Memory Device The present invention controls the modes of the windows displayed on the display device of the computer system in response to its active/inactive state. The hardware configuration of the computer system for realizing such window control is described in this item.

In FIG. 1, there is schematically shown a hardware configuration of a typical personal computer (PC) 100 for implementing the present invention. An example of the PC for implementing this invention is a type of PC which conforms to the specification of OADG (PC Open Architecture Developer's Group) and incorporates an operating system (OS) such as "Windows95" of Microsoft Corporation or "OS/2" of IBM Corporation. Hereinafter, each component will be described.

The CPU 11 acting as a man controller executes a variety of programs under the control of OS. The CPU 11 may be a CPU chip called "Pentium" or "MMX Technology Pentium" made by Intel Corporation.

The CPU 11 interconnects with each hardware block (described later) through a hierarchical bus structure of three levels, which comprises a processor bus 12 directly coupled to its own external pins, a PCI (Peripheral Component Interconnect) bus 16 as a local bus, and an ISA (Industry Standard Architecture) bus 18 as a system bus.

The processor bus 12 and the PCI bus 16 are interconnected by a bridge circuit (host-PCI bridge) 13. This bridge circuit 13 in the embodiment comprises a memory controller for controlling access operations to a main memory 14, a data buffer for absorbing a difference in data transfer speeds between both the buses 12 and 16.

The main memory 14 is a writable memory used as read-in areas of executed programs of the CPU 11 or working areas of the processed data of the executed programs. In general, the main memory 14 comprises a plurality of DRAM (dynamic RAM) chips such that its basic capacity is typically 32 MB and extendable up to 256 MB. The executed programs include an OS such as "Windows 95," each device driver for operating peripheral equipment as hardware and a variety of application programs.

A L2-cache 15 is a high-speed memory for absorbing an access time of the CPU 11 to the main memory 14 and is used for temporarily storing limited codes and data to be frequently accessed by the CPU 11. In general, the L2-cache 15 comprises SRAM (static RAM) chips and its typical storage capacity is 512 KB.

A PCI bus 16 is a type of bus that enables to transfer data at a relatively high rate (bus width: 32/64 bits, maximum operating frequency: 33/66 MHz, maximum data transfer rate: 132/264 MBps), and is used for connecting relatively fast PCI devices such as a video controller 20 and a card bus controller 23. As well known in the art, the PCI architecture is based on the proposal of Intel Corporation and implements the so-called "PnP" (Plug and Play) function.

The video controller 20 is a dedicated controller for actually processing drawing instructions from the CPU 11. In operation, it temporarily stores the processed drawing information into a screen buffer (VRAM) 21, reads the drawing information from the VRAM 21, and provides the same as a video output to a liquid crystal display (LCD) or a CRT display 22. The video controller 20 has a resolution corresponding to XGA (Extended Graphic Array) or SVGA (Super Video Graphic Array) function, and supports the bitmap display scheme.

The card bus controller 23 is a dedicated controller for directly coupling the bus signals on the PCI bus 16 to an interface connector (card bus) of a PC card slot 24A. Insertable into this PC card slot 24A is a PC card 24B, which conforms to the industry standard (e.g., "PC Card Standard 95") defined by PCMCIA (Personal Computer Memory Card International Association)/JEIDA (Japan Electronic Industry Development Association). As the types of PC card 24B, there is a LAN card for connection to a network, an integrated HDD card as an external storage device, a SCSI (Small Computer System Interface) card for connection to an external SCSI device, and the like. The computer system 100 mounted with the LAN card is connected in a gateway scheme to the internet through a router, not shown, so that it becomes possible to use WWW (World Wide Web) as a broad area information retrieval system. It is possible to download the application program, not shown, in the embodiment of the present invention or an advertisement information as a notified information from a VWW server of the internet.

The PCI bus 16 and the ISA bus 18 are interconnected by a bridge circuit (PCI-ISA bridge) 19. This bridge circuit 19 is constructed to contain a DMA controller, a programmable interrupt controller (PIC), and a programmable interval timer (PIT). The DMA controller is a dedicated controller for executing a data transfer between a peripheral device (e.g., FDD 31) and the main memory 14 without an intervention of CPU 11. The programmable interrupt controller (PIC) is a dedicated controller that is responsive to an interruption request (IRQ) from the peripheral device for causing a predetermined processing program (interrupt handler) to be executed. For example, the pointing device (described later), such as the mouse, is assigned with an IRQ level 12, and the PIC operates as the interrupt handler for urging the execution of the mouse driver by an assert of the IRQ 12. The programmable interval timer (PIT) is an apparatus for generating timer signals (normally, in the form of square waves) at predetermined frequencies, which are programmable.

Also, the bridge circuit 19 is provided with an IDE interface for connecting the external storage devices, which conform to the IDE (Integrated Drive Electronics). To this IDE interface, an IDE hard disk drive (HDD) 25 and an IDE CD-ROM drive 26 may be connected by means of ATAPI (AT Attachment Packet Interface). In place of the IDE CD-ROM drive 26, another type of an IDE device such as a DVD (Digital Video Disk or Digital Versatile Disk) drive may be connected. The external storage devices such as the HDD 25 and/or the CD-ROM drive 26 are contained at a certain place in the computer 100, which may be called "media bay" or "device bay." These external storage devices as standard features may be mounted interchangeably and exclusively with another device such as an FDD and/or a battery pack (in the case of notebook PC).

The HDD 25 is better than another external storage device in terms of its data transfer rate. Accordingly, by copying software programs (e.g., OS, applications) onto disks of HDD 25 (i.e., by "installing" them), these programs are ready for use by the computer 100. The CD-ROM drive 26 is used to install the software programs stored in the compact disk (CD) to the system or to reproduce a music CD (CD-DA data). For example, the application programs (described later) are stored in the CD, and the CD is supplied to the system 100 to install the application programs.

Further, the bridge circuit 19 in the embodiment has a USB route controller for connecting a USB (Universal Serial Bus) as a general purpose bus, as well as a USB port 27. The USB supports the "Hot Plugging" function for allowing a new peripheral device (USB device) to be attached/detached while its power is turned on, in addition to the "Plug and Play" function for automatically recognizing a newly connected peripheral device and for performing re-setup of the system configuration. To a single USB port, a maximum of sixty-three USB devices can be connected in a daisy chain fashion. Examples of the USB devices are a keyboard, a mouse, a joystick, a scanner, a printer, a modem, a display monitor, a tablet, and the like.

The ISA bus 18 has a slower data transfer rate than the PCI bus 16 (bus width: 16 bits, maximum data transfer rate: 4 Mbps) and, thus, it is used for connecting relatively slower peripheral devices such as a ROM 17, a modem card 28, a real time clock (RTC) 29, an I/O controller 30, a keyboard/mouse controller (KMC) 34, and an audio controller 37.

The ROM 17 is a non-volatile memory, which permanently stores code groups (BIOS: Basic Input/Output System) for controlling the I/O operations of the respective hardware components such as a keyboard 35 and FDD 31, in addition to a POST (Power On Self Test) program or the like.

The modem card 28 is a device for transmitting computer data in a digital form via an analog telephone line (PSTN: Public Switched Telephone Network). The modem card 28 includes a signal processing circuit (modem chip) for modulating the transmission data and for demodulating the received data, as well as other circuit components such as a data access arrangement (DAA) circuit for connecting the modem to a public line in accordance with the line switching standards for each country. The computer system 100 provided with the modem card 28 is capable of connecting to another computer system through the public line. The computer system 100 is connected to the internet in a dial-up IP scheme through a service provider for example, so that it becomes possible to utilize the WWW (World Wide Web) as the broad area retrieve system. It is possible to download the application program, not shown, or an advertisement information as a notified information in the embodiment of the present invention from a WWW server of the internet.

The RTC (Real Time Clock) 29 is a device for measuring the current time-of-day. In general, the RTC 29 is mounted on a single chip with a CMOS memory (not shown). Typically, this CMOS memory is used for temporarily storing critical information to security/safety of the computer 100 such as system configuration information (setup value of BIOS) and a power-on password. The RTC/CMOS 29 is backed up by a backup battery (normally a coin battery: not shown) so that the measured/stored contents are not lost even if the computer system 100 goes to its power-off state.

The I/O controller 30 is a peripheral controller for controlling operations of FDD 31, the I/O operations of parallel data (PIO) via a parallel port 32, and the I/O operations of serial data (SIO) via a serial port 33. A printer may be connected to the parallel port 32, and a joystick may be connected to the serial port 33.

The FDD 31 is one of the external memory devices, like the HDD 25 and the CD-ROM drive 26. The FDD 31 is used to install the software programs stored in the floppy disk to the computer system 100 or to store the working data/files in the FD. The application programs (described later) may be stored in the FD, and the FD may be supplied to the system 100 to install the application programs.

The keyboard/mouse controller (KMC) 34 is a peripheral controller for capturing the input scan codes from the keyboard 35, or the input coordinate values from the pointing device 36 (the mouse 36 or the track point) as the computer data. Generally, the keyboard 35 is assigned with an IRQ level 1, and the mouse 36 is assigned with an IRQ level 12. When the KMC 34 detects the input of the scan codes, it asserts the ORQ 1, and when the KMC 34 detects the displacement of the mouse ball or the click of the mouse button, it asserts the IRQ 12.

The Audio controller 37 is a dedicated controller for performing the I/O processing of audio signals, and it includes a CODEC (COder-DECoder or an AD/DA converter having a mixing function) for recording/reproducing the audio signals in a digital form. The audio signals may be received as voice signals from a microphone 39, or as a line input from an external audio equipment (not shown). Conversely, the generated audio signals may be provided as a line output to an external audio equipment (not shown), or reproduced by a speaker 38 after amplified by an audio amplifier.

At one end of the buses 16 and 18, at least one PCI bus slot 16A and at least one ISA bus slot 18A may be provided, respectively. These bus slots 16A and 18A are provided in a motherboard in the computer system 100, for example. A PCI compatible adapter card 16B and an ISA compatible adapter card 18B may be mounted in the bus slots 16A and 18A, respectively. One example of the adapter cards is a LAN card for connecting the computer 100 to a network, and another example is a SCSI card for connecting to a variety of SCSI devices including an HDD, a CD-ROM drive, a DVD drive, and a printer. The computer system 100 mounted with the LAN card is connected in a gateway scheme to the internet through a router, not shown, so that it becomes possible to use WWW (World Wide Web) as a broad area information retrieval system. It is possible to download the application program, not shown, or an advertisement information as a notified information in the embodiment of the present invention from a WWW server of the internet.

A typical user of the personal computer 100 operates the system through keyboard 35 or mouse 36 to execute various application programs such as a word processing program, a spreadsheet program, and a communication program so that the executed result is useful for accomplishing his/her work on the display screen. The user can install the desired application program into the computer system 100 by copying the application program to the HDD 25 from the CD-ROM drive 26 or the FDD 31, or by downloading the application program to the HDD 25 from the external computer system (such as WWW server) through the network. It is noted that the present invention can be realized in the aspect of the system into which the application program is installed.

The general purpose personal computers commercially available in the current marketplace will sufficiently function as the computer system 100 shown in FIG. 1. The computer system 100 may be one of the personal computer, the notebook computer, the palmtop computer, the workstation, the main frame computer, and the super computer. The computer system 100 may be another type computer. For example, the computer system 100 may be a network server or a meeting system with the video device.

It is apparent that additional electronic circuits or the like other than those shown in FIG. 1 are required to construct the computer system 100. However, these components are not described in the present specification, since they are well known in the art and yet they do not pertain to the gist of this invention. Also, it should be understood that for brevity of the drawings, only a portion of the connections between the illustrated hardware blocks is shown.

B. Software Structure of the Computer

FIG. 2 schematically shows a hierarchical structure of the software programs capable of being executed by the computer system 100 in the embodiment.

Hardware Control Layer

A hardware control layer which is the lowest layer is a software layer for hiding physical differences of each hardware from the upper software, such as the applications or the OS, and is constructed as a module for each hardware. The hardware control layer includes two functions. One function is to perform the input/output operation for the hardware. That is, the hardware control layer converts the instructions given by the software of the upper layer, such as the application or the OS, to a proper form in accordance with the specification of the hardware to execute the input/output operation for the hardware. The other function is to execute the process corresponding to the events (hardware interrupt) generated in each hardware.

The hardware control layer is packaged in the motherboard in the form of the BIOS (Basic Input/Output System) stored in the ROM 17 or installed to the computer system 100 from the floppy disk or the CD-ROM in the form of the device driver, such as the mouse driver, the printer driver, the CD-ROM driver.

For example, the mouse driver is a device driver for performing the input/output operation for the pointing device, such as the mouse 36. The mouse driver is an interrupt handler for processing the interrupt level IRQ 12 of the mouse 36, and the CPU 11 executes a required operation in response to the assert of the IRQ 12. More particularly, the mouse driver performs the I/O read access to the KMC 34 to read the input value from the mouse 36, and sends them as a message to a queue of the operating system (OS).

Operating System (OS)

The operating system (OS) is the basic software for totally managing the hardware and the software in the system 100, and the example of the OS is the "Windows95," "OS/2" described before or "UNIX." To realize the display control of the windows in accordance with the present invention, it is preferable that the OS is provided with a multitask environment. Generally, the OS includes a Kernel area and a user area.

The Kernel area is a portion into which the functions for monitoring the operation of the entire system 100 to support the execution of each software program are gathered. Included in the Kernel area are "the file managers" for managing a record of files to the external memory device, such as the HDD 25, "the scheduler" for managing a sequence or a priority in executing the tasks, "the memory manager" for managing the use of memory space, and "the resource manager" for managing an assign of the system resource (i.e., the system configuration), such as the I/O address, the IRQ level, the DMA level, etc. The scheduler includes a queue for dispatching the received message in a first in first out (FIFO) scheme (for example, the change of environment, such as "the key was depressed," "the mouse was moved," and the information following thereto).

The user area mainly includes the functional routines for supporting the execution of the activated application. More particularly, it includes "user interface" or "window system." The "user interface" (referred to as "shell") has a function for interpreting the commands from the user to transfer them to the Kernel, and for returning the response from the Kernel to the user. In the recent years, the bitmap display scheme is naturally used, and the main stream is the "Graphical User Interface (GUI)" which is capable of the user input by the manipulation of the mouse onto the object, such as the icon, displayed on the display surface. The "window system" is a functional portion for executing the window display on the display device 22 and executes each application assigned to each window by switching the windows. The examples of the window system are "X Window" of UNIX, and "Presentation Manager" of the "OS/2."

The OS includes a group of the functions for causing the application to call each function of the OS; i.e., Application Programming Interface (API). Since the application merely sends the logical and abstract instructions to the OS, the differences between the hardware is absorbed, so that a standardized operation of the hardware is guaranteed.

Application Programs

The application programs at the uppermost position is a software program for causing the system 100 to execute a particular operation for a practical use, and the examples of the application programs are a word processing software, a spreadsheet software, a communication software, a browser software (WWW browse), etc. The display control operation of the windows relating to the present invention is handled as a kind of application program. Each application is assigned with an icon and is displayed on the display (i.e., the desktop) 22 in the form of the icon. The user can select a desired application to activate the application by selecting the icon thereof by double clicking the mouse 36. The activated application is assigned with a window.

Usually, the user of the computer system 100 can get the necessary software program (the OS, the device driver application, etc.) in the form of the storage medium storing the software, such as the FD, CD-ROM, etc. The software program becomes a usable condition on the system 100 by mounting these storage medium in the drive unit, such as the FDD 31 or the CD-ROM drive 26, and copying the desired software program into the disks of the HDD 25 (that is, by installing it in the system 100). Recently, such cases have been increased that the software program is installed in the system 100 by downloading the software program to the HDD 25 from an external computer system (for example, the WWW server in the internet) through the Modem 28 or the LAN adapter 16A.

Most of the recent programs are coded in the event-driven form in which it receives the change of the environment, such as "the mouse was clicked," and the information generated therewith in a form of message. It is based upon a general rule that most of the execution time of the program is occupied by a time for waiting for the input operation of the key/mouse. The OS sequentially dispatches each message to each of the corresponding programs. The program of the event-driven form operates based upon the type of received message and the information, and when the operation is terminated, it returns a right for controlling the system 100 to the OS.

C. Input Operation of Coordinates by Mouse

To sum up, the present invention controls the form of the windows displayed on the display 22 in response to the input operation of the coordinates by the mouse 36. In this item, the input operation of the coordinates by the mouse is described.

In FIG. 3, a mechanism for processing the inputted data from the mouse 36 is schematically shown. The mouse 36 includes a mouse body gripped by the user, the left and right buttons provided on the upper surface, and the mouse ball rotatably attached on the bottom surface.

The rotation of the mouse ball is optically read, and the rotating direction and an amount of rotation are encoded and are outputted as the displacement amount (dx, dy) in X axis and Y axis. The depression of the left button (b1) or the right button (b2) is outputted as "1," and the release of them is outputted as "0." The mouse 36 sends the detected values (dx, dy, b1, b2) to the keyboard/mouse controller (KMC) 34 at several tens(ms) cycle.

The KMC 34 is interconnected with the CPU 11 through the busses 16/18, and includes an I/O register to which the CPU 11 can access. A portion of the I/O register is assigned to a field into which the detected values (dx, dy, b1, b2) are written. The KMC 34 generates the interrupt request IRQ if at least one of the newly written values (dx, dy, b1, b2) is changed. The interrupt level for the mouse used by the KMC 34 is IRQ 12 in the case of the computer compatible to PC/AT, as described before, ("PC/AT" is Trademark of IBM Corporation).

When the CPU 11 detects the assertion of the IRQ 12, it compulsorily IS interrupts the execution of the program (the OS or the application) and executes the "mouse driver" which is the interrupt handler of the IRQ 12.

The mouse driver performs the I/O read access to the KMC 34 to read the values (dx, dy, b1, b2) detected by the mouse 36. And, the event which is the change of the detected values, and the information therewith are entered into the queue of the OS as the message. Thereafter, the message is dispatched to the program waiting for the mouse input.

The basic functions are provided by the input operation of the mouse 36, as described above. One function is a two-dimensional moving function of the cursor (the mouse cursor) on the display screen, and this function is performed by moving the mouse on the desk to rotate the mouse ball of the bottom surface of the mouse body. The other function is an object select function, and this function is realized by stopping the cursor at the desired position and clicking the left button on the upper surface of the mouse.

The above description merely shows one example of the operation for inputting the coordinate values. The present invention is not defined to the use of the above input operation of the coordinate values. As the device for inputting the coordinate values, the track ball, the touch pad, or the track point can be used rather than the mouse.

D. Switching Operation of the Display of the Objects/Windows

The hardware and the software for realizing the present invention have been described hereinbefore.

The switching operation of the display of the objects/windows of the present invention can be realized not only by a dedicated hardware device, but also by executing the predetermined application on the general purpose computer system 100 shown in the FIG. 1. In this item, the operation of the later case is described. As described before, the application is installed in the system 100 by mounting the storage medium, which stores the software codes relating to the application, in the drive unit, such as the FDD 31 or the CD-ROM drive 26, and copying the software program into the HDD 25. The software program is also installed in the system 100 by downloading the software program to the HDD 25 from an external computer system (for example, the Web server in the internet) through the network.

In one aspect of the present invention, the application program realizing the present invention is coded in the event waiting scheme. That is, the application program executes the predetermined window display operation, described later, in response to the received message including the information relating to the change of the event, which is the manipulation of the mouse or the input operation by the pointing device equivalent to the mouse. FIG. 4 shows a processing routine of the application program in the form of the flow chart. This processing routine is described hereinafter.

The application is registered on the desktop, for example, of the computer system 100, wherein the object (icon) relating to the application is displayed on the display screen. The user moves the mouse cursor to the object area and double clicks the mouse button. The application can be activated by the select operation by the user equivalent to the above operation. The activated application appears on the display screen as the window by the operation of the above-described window system of the OS. And, the application waits for the occurrence of the event relating to the manipulation of the mouse (the dispatch of the message) in a step 100.

Next, if the message is dispatched, a determination is made as to whether the is massage is related to the movement of the mouse, or not, in a step 102. If the message is related to another message, the event process for another message is executed in a step 104. Although the process of the step 104 is treated as an exceptional process; i.e., "event process for another message," in the description relating to the embodiment of the present invention, the step 104 is actually the main routine of the application. In other words, in most cases, the switching operation of the display of the windows later described is the exceptional routine of the application. The main routine includes an interactive input/output operation and the process relating the input/output operation, for example.

If the message is the movement of the mouse, a determination is made as to whether the contents of the message include that the mouse cursor enters into the application window area, or not, in a step 106. The answer YES of the decision block 106 indicates a probability that the focus or interest of the user is moved to the application window. In this case, the time period elapsed after the enter of the mouse cursor into the application window is measured in a step 108. In the case that the mouse cursor stays in the application window over a time period equal to or longer than a predetermined value, it is believed that the focus or the interest of the user is directed to this application. That is, since it means that the application window is returned to the active state, the operation proceeds to the next step 110 in which the displayed content is returned to the regular window display content of the application, and the operation proceeds to a step 112 in which the contents for processing the events in the window area (for example, the contents of the process performed when a predetermined position in the window is clicked) are returned to the original contents of the application. Next, the operation returns to the first step 100 to wait for the dispatch of the next message.

If the mouse cursor is moved out of the application window before a lapse of the predetermined time period, it means that the focus of the user is not completely directed to the application. Accordingly, the dispatched message does not have any meaning from the viewpoint of the switch of the display of the window, so that the operation returns to the first step 100 through the path "NO" of the decision step 108 to wait for the dispatch of the next message.

If the answer of the step 106 is NO, a determination is made as to whether the contents of the message indicates that the mouse cursor is moved out the application window, or not, in a step 120. If the result of the decision step is NO, the dispatched message does not have any meaning from the viewpoint of the switch of the display of the window, so that the operation returns to the first step 100 through the path "NO" of the decision step 120 to wait for the dispatch of the next message.

If the result of the decision step 120 is YES, it means a probability that the focus of the user is not directed to the application window. In this case, a time period elapsed after the exit of the mouse cursor from the application window is measured in a step 122. In the case that the predetermined time period is elapsed after the exit of the mouse cursor from the application window, it is believed that the focus or the interest of the user to this application is completely lost. That is, it means that the application window is fallen into the inactive state. When the application window is in the inactive state, it is meaningless to display the regular contents of the application. The application proceeds to a next step 124 in which the contents of the window are switched to display other contents.

Other contents in the specification are preferably useful notification information for the user. The notification information may be the status of another application, such as the status of mail. The notification information may also be an advertisement. The bitmap of the advertisement can be stored in the local storage device, such as the HDD 25. The bitmap of the notification information can be periodically or non-periodically downloaded from an external computer system, such as the Web server, which is accessible through the network, such as the internet. The step 104 entitled as "another event process" described before can include such download operation. The reasoning behind displaying such notification information in place of the regular contents of the application is that it has been determined based upon an experimental analysis that when the application is in the inactive state, the user does not require the display of the regular contents of the inactive application. It also provides a remarkable effect that the display area is effectively used for another purpose.

After the switch of the contents of the window display in the step 124, the contents for processing the events in the window area are switched to the contents for processing the message in a step 126. Next, the operation returns to the first step 100 to wait for the dispatch of the next message.

If the mouse cursor is returned again to the application window before the lapse of the predetermined time period in the step 122, it means that the user's focus to the application is still maintained. Accordingly, the dispatched message does not have any meaning from the viewpoint of the switch of the display of the window, so that the operation returns to the first step 100 through the path "NO" of the decision step 122 to wait for the dispatch of the next message.

FIG. 5 shows one example of the regular contents of the application window. This application window is a King of Translation, which is created and marketed by IBM Japan Ltd. The King of Translation is a machine translation tool for translating the text on the internet; i.e., the Web pages. As shown in the FIG. 5, the regular window of the King of Translation includes a window frame for defining an area of the window area, a belt-like title bar provided on a top portion of the frame and a main portion of the window. The title bar is provided with a system menu button at its left end, and the title of the application on its central portion. In general, the information/contents for realizing the works relating to the application are displayed in the main portion of the window. In the case of the King of Translation, the objects in the form of the four buttons are displayed, as shown, wherein each button is assigned with an input contents of "SET UP," "STOP," "HELP," and "END." The King of Translation responds to the depress of any button to execute the function corresponding to the depressed button. Such regular display of the application window is made at the activation of the application and the active state of the application.

Another feature of the King of Translation is that it has a proxy function, and it exists between the WWW server and the Web browser to perform the file download process in response to the request from the Web browser, as known in the art. The translation proxy hands a text portion of the downloaded HTML files to a translation engine to cause it to translate them. The translation engine converts the supplied original text of a first language (English) to a text of a second language (Japanese) by referring to a dictionary. When the WWW browser receives the results of translation from the translation proxy, it displays the results along with the image files described in the HTML files (GIF files or JPEG files) on the display 22.

In the FIG. 6, one aspect of the display contents in the window switched to the notification information is shown.

The contents of the main portion of the window is switched from the buttons shown in the FIG. 5 to the notification information. In the FIG. 6, the notification information is an advertisement information of a particular company. To realize such window display, the bitmap of the advertisement information can be stored in the local external storage device, such as the HDD 25. The bitmap of the notification information can be also regularly or nonregularly downloaded from the external computer system, such as the Web server, which can be accessed through the network, such as the internet. The display of such notification information in place of the regular contents of the application is based upon the empirical knowledge that the user does not require the regular display contents in the inactive state, and it realizes the effective use of the display area.

It is noted in the FIG. 6 that the title bar is still displayed even if the display contents of the window is switched. Since the title bar is continuously displayed during the display of the contents, which is not directly related to the application, the user can easily know the owner of the window, so that the user can easily switch the status of the window from the inactive state (the unfocused state) to the active state (the focused state). However, in the case that the user knows the owner of the window, it is not necessary to display the title bar, and it is possible to use all the area of the window frame to display the notification information.

The purpose for applying the present invention to the "King of Translation" is that the contents of the advertisement information used as the notification information can be easily gotten from the Web server by using the proxy function of the Web browser. It is noted, however, that the present invention can be applied to an application which does not have the proxy function.

E. Supplementary Explanation:

Although a specific embodiment of the present invention has been disclosed, it to will be understood by those having skill in the art that changes in that specific embodiment can be made without departing from the spirit and the scope of the present invention. Although the embodiment of the present invention has been described by using the PC/AT compatible machines which conform to the specification of the OADG (PC/AT is the Trademark of the IBM Corporation), the present invention is easily realized by using other types of general-purpose computers, such as PC98 Series of NEC Corporation, Macintosh of Apple Computer Inc., and the compatible machines thereof, or the dedicated machines for a particular purpose. In other words, the present invention has been described by using the specific embodiment, the present invention should not be limited to the specific embodiment, and the present invention should be construed by referring to the claims.

MERITORIOUS EFFECTS OF THE INVENTION

As described before, the present invention can provide an excellent display apparatus of a type in which the processed data are displayed on the display screen in the bitmap manner, and a method for controlling the display apparatus.

Also, the present invention can provide an excellent display apparatus capable of simultaneously displaying a plurality of objects and windows on the display screen and a method for controlling the display apparatus.

Also, the present invention can provide an excellent display apparatus effectively using the display area of the object/window in the inactive state existing on the display screen and a method for controlling the display apparatus.

DESCRIPTION OF SYMBOLS

11 . . . CPU
12 . . . Processor bus
13 . . . Host-PCI bridge
14 . . . Main memory
15 . . . L2-cache
16 . . . PCI bus
16A . . . PCI bus slot
16B . . . PCI compatible adapter card
17 . . . ROM
18 . . . ISA bus
18A . . . ISA bus slot
18B . . . ISA compatible adapter card
19 . . . PCI-ISA bridge
20 . . . Video controller
21 . . . VRAM
22 . . . Display
23 . . . Card bus controller
24A . . . Card slot
24B . . . PC card
25 . . . HDD
26 . . . CD-ROM drive
27 . . . USB port
28 . . . Modem
29 . . . RTC
30 . . . I/O controller
31 . . . FDD
32 . . . Parallel port
33 . . . Serial port
34 . . . KMC
35 . . . Keyboard
36 . . . Mouse
37 . . . Audio controller
38 . . . Speaker
39 . . . Microphone
100 . . . Personal computer

What is claimed is:

1. A display apparatus comprising:
 a display having a display screen on which data are displayed in a bitmap manner;
 an object/window display means for displaying at least one object/window on said display screen;
 a pointing device for pointing coordinates on said display screen;
 a mouse cursor control means for responding to a manipulation of said pointing device to control the display of a mouse cursor on said display screen;
 a mouse cursor monitor means for determining as to whether said mouse cursor resides within a predetermined object/window, or not;
 a storage means for storing notification information which should be notified to a user; and
 an object/window display control means for displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window.

2. A display apparatus according to claim 1 wherein said notification information is a status of another application executed on said display apparatus.

3. A display apparatus according to claim 1 wherein said notification information is an advertisement information.

4. A display apparatus according to claim 1 wherein a title bar of the original object/window is displayed when said notification information is displayed on said display area of said original object/window.

5. A display apparatus installed with a window system for displaying at least one object/window on a display screen of a display in a bitmap manner, comprising:

a processor executing a software program;

a memory for temporarily storing program codes and data being processed;

a pointing device for pointing to coordinates on said display screen;

a mouse cursor control means for responding to a manipulation of said pointing device to control the display of a mouse cursor on said display screen;

a mouse cursor monitor means for determining as to whether said mouse cursor resides within a predetermined object/window, or not;

a storage means for storing notification information which should be notified to a user;

an object/window display control means for displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window; and a connecting means for connecting to a network.

6. A display apparatus according to claim 5 wherein said notification information is an advertisement information which is regularly or nonregularly updated through an internet.

7. A method for controlling a display apparatus installed with a window system for displaying at least one object/window on a display screen of a display in a bitmap manner, and including a pointing device for pointing to coordinates on said display screen and a storage means for storing notification information which should be notified to a user, comprising the steps of:

(a) responding to a manipulation of said pointing device to control the display of a mouse cursor on said display screen;

(b) determining as to whether said mouse cursor resides within a predetermined object/window, or not; and (c) displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window.

8. A method for controlling a display apparatus installed with a window system for displaying at least one object/window on a display screen of a display in a bitmap manner, and including a processor for executing a software program, a memory for temporarily storing program codes and data being processed, a pointing device for pointing coordinates on said display screen, a storage means for storing notification information which should be notified to a user, and a connecting means for connecting to a network, comprising the steps of:

(a) responding to a manipulation of said pointing device to control the display of a mouse cursor on said display screen;

(b) determining as to whether said mouse cursor resides within a predetermined object/window, or not; and (c) displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window.

9. A method for controlling a display apparatus according to claim 8 wherein said notification information is a status of another application executed on said display apparatus.

10. A method for controlling a display apparatus according to claim 8 wherein said notification information is an advertisement information.

11. A method for controlling a display apparatus according to claim 8 wherein said notification information is an advertisement information which is regularly or nonregularly updated through an internet.

12. A method for controlling a display apparatus according to claim 8 wherein a title bar of the original object/window is displayed when said notification information is displayed on said display area of said original object/window.

13. A computer readable storage medium for storing in a tangible form a computer program executable on a computer system installed with a window system for displaying at least one object/window on a display screen of a display in a bitmap manner, and including a pointing device for pointing to coordinates on said display screen, and a storage means for storing notification information which should be notified to a user, said computer program comprising:

(a) a routine for responding to a manipulation of said pointing device to control the display of a mouse cursor on said display screen;

(b) a routine for determining whether said mouse cursor resides within a predetermined object/window, or not; and (c) a routine for displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window.

14. A computer readable storage medium according to claim 13 wherein said notification information is a status of another application executed on said display apparatus.

15. A computer readable storage medium according to claim 13 wherein said notification information is an advertisement information.

16. A computer readable storage medium according to claim 13 wherein a title bar of the original object/window is displayed when said notification information is displayed on said display area of said original object/window.

17. A computer readable storage medium for storing in a tangible form a computer program executable on a computer system installed with a window system for displaying at least one object/window on a display screen of a display in a bitmap manner, and including a processor for executing a software program, a memory for temporarily storing program codes and data being processed, a pointing device for pointing to coordinates on said display screen, a storage means for storing notification information which should be notified to a user, and a connecting means for connecting to a network, said computer program comprising:

(a) a routine for responding to a manipulation of said pointing device to control the display of a mouse cursor on said display screen;

(b) a routine for determining as to whether said mouse cursor resides within a predetermined object/window, or not; and (c) a routine for displaying regular display contents in a display area of said predetermined object/window while said mouse cursor resides within said predetermined object/window, or fetching said notification information from said storage means to display said notification information in said display area of said predetermined object/window while said mouse cursor has disappeared from said predetermined object/window.

18. A computer readable storage medium according to claim 17 wherein said notification information is an advertisement information which is regularly or nonregularly updated through an internet.

19. A method for displaying information to a user of a digital data device, said digital data device having a display screen and a pointing device for pointing to coordinates of said display screen, said digital data device supporting the simultaneous display of a plurality of windows on said display screen, each window having a content defined by a respective one of a plurality of corresponding processes executing on said digital data device, each window being in either an active state or an inactive state, said method comprising the steps of:

determining whether a first window displayed on said display screen is in an active state;

responsive to said first window being in an active state, displaying in said first window content defined by the process corresponding to said first window; and responsive to said first window being in an inactive state, replacing in the display of said first window at least some of said content defined by the process corresponding to said first window with notification information not defined by the process corresponding to said first window.

20. The method for displaying information to a user of a digital data device of claim 19, wherein said notification information is advertisement information.

21. The method for displaying information to a user of a digital data device of claim 19, wherein said notification information is a status of at least one process other than the process corresponding to said first window.

22. The method for displaying information to a user of a digital data device of claim 19, wherein said step of replacing in the display of said first window at least some of said content does not replace a title bar of the original window.

23. A computer readable storage medium for storing in a tangible form a computer program executable on a computer system, said computer system having a display screen and a pointing device for pointing to coordinates of said display screen, said computer system supporting the simultaneous display of a plurality of windows on said display screen, each window having a content defined by a respective one of a plurality of corresponding processes executing on said digital data device, each window being in either an active state or an inactive state, wherein said computer program, when executed by said computer system causes the computer system to perform the steps of:

determining whether a first window displayed on said display screen is in an active state;

responsive to said first window being in an active state, displaying in said first window content defined by the process corresponding to said first window; and responsive to said first window being in an inactive state, replacing in the display of said first window at least some of said content defined by the process corresponding to said first window with notification information not defined by the process corresponding to said first window.

24. The method for displaying information to a user of a digital data device of claim 23, wherein said notification information is advertisement information.

25. A computer system comprising:

at least one central processing unit;

a memory;

a display screen for displaying information to a user;

a pointing device for pointing to coordinates on said display screen coupled to a pointer controller, said pointer controller receiving input from said pointing device and controlling the display of a pointer on said display screen in response thereto;

a window manager supporting the simultaneous display of a plurality of windows on said display screen, each window having a content defined by a respective one of a plurality of corresponding processes executing on said at least one central processing unit of said computer system, each window being in either an active state or an inactive state;

wherein, responsive to a first window being in an active state, content defined by the corresponding process is displayed in said first window; and wherein, responsive to said first window being in an inactive state, at least some of said content defined by the corresponding process is replaced by notification information not defined by the corresponding process in the display of said first window.

26. The computer system of claim 25 wherein said notification information is advertisement information.

* * * * *